United States Patent [19]

Kilham

[11] Patent Number: 4,841,910
[45] Date of Patent: Jun. 27, 1989

[54] BENDABLE COILED WIRE BIRD PERCH

[76] Inventor: Peter Kilham, Mill Rd., Foster, R.I. 02825

[21] Appl. No.: 140,256

[22] Filed: Dec. 31, 1987

[51] Int. Cl.$^4$ .......................................... A01K 31/12
[52] U.S. Cl. .................................................. 119/26
[58] Field of Search ............... 119/24, 26, 51 R, 52 R

[56] References Cited

U.S. PATENT DOCUMENTS

| 1,052,234 | 2/1913 | Gaertner | 119/26 X |
| 1,951,550 | 3/1934 | Little | 119/26 |
| 2,045,395 | 6/1936 | Leindorf | 119/26 |
| 3,482,549 | 12/1969 | Episcopo | 119/51 R |
| 3,568,641 | 3/1971 | Kilham | 119/51 R |
| 4,104,987 | 8/1978 | Winston | 119/51 R |
| 4,188,913 | 2/1980 | Earl et al. | 119/51 R |
| 4,223,637 | 9/1980 | Keefe | 119/51 R X |
| 4,541,362 | 9/1985 | Dehls | 119/51 R |

Primary Examiner—Robert P. Swiatek
Assistant Examiner—R. Thomas Price
Attorney, Agent, or Firm—Robert J. Doherty

[57] ABSTRACT

A bird perch formed of a bendable, tightly wound wire formed in a generally hollow cylinder. A first end of the perch is adapted for replaceable mounting in a bird feeder opening, and the body of the perch adapted to downwardly bend when a large, that is, heavy, bird attempts to rest thereon and remain generally straight to support small, that is, light, birds resting thereon. The individual wire windings are closely spaced or touching to prevent the birds' feet from being caught in the spaces therebetween.

10 Claims, 1 Drawing Sheet

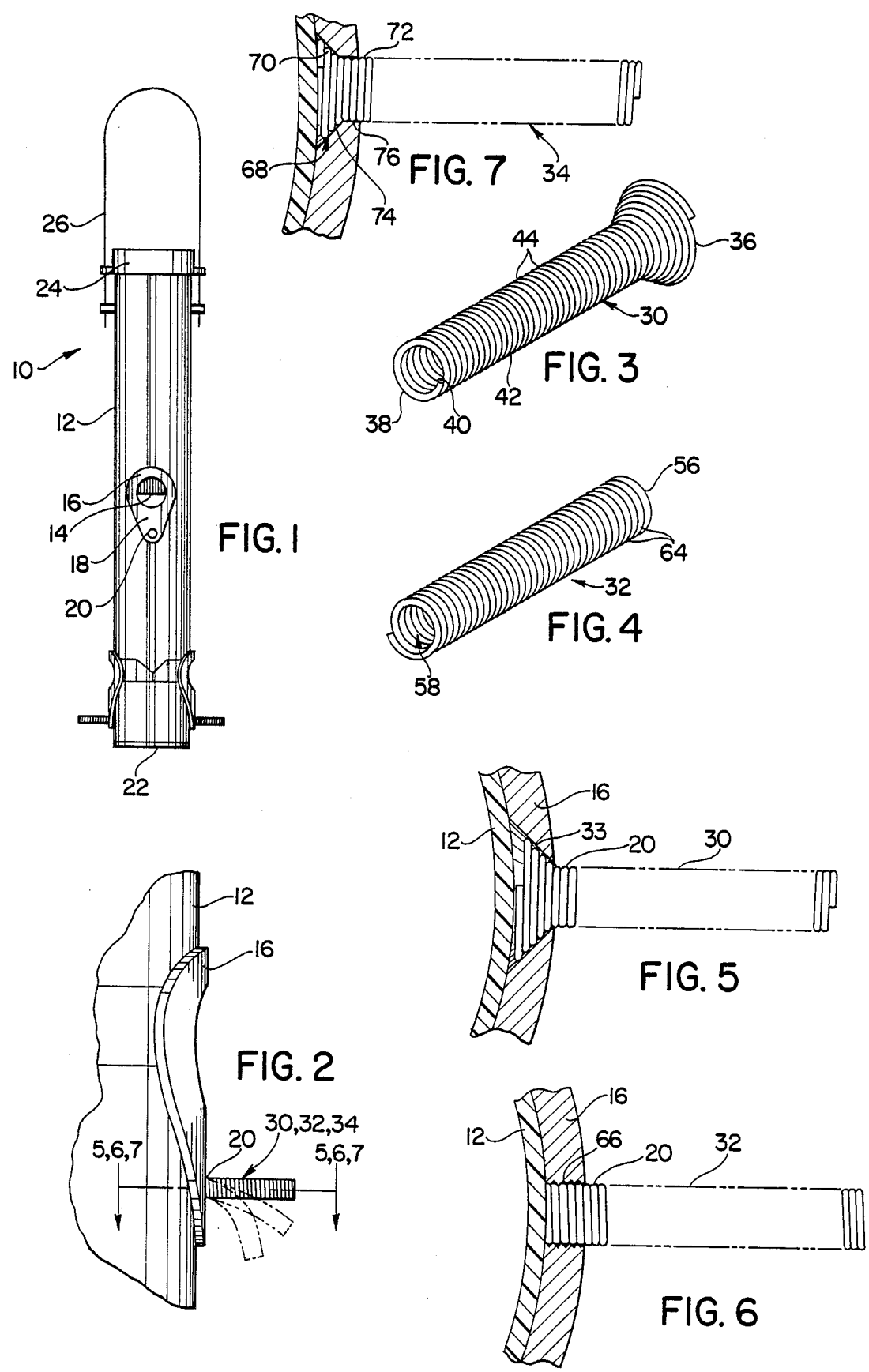

BENDABLE COILED WIRE BIRD PERCH

BACKGROUND AND OBJECTS OF THE INVENTION

This invention relates to a perch for a bird feeder and more particularly to a perch which discriminates between large and small birds such that large birds will slide off the perch and not be able to gain access to the feed within the feeder, while small birds will be able to alight thereon and successfully obtain feed in the desired manner.

Many bird feeders are known which include perches for birds to alight upon while gaining access to the feed held within the feed container. On such popular feeder is a clear plastic tubular device including pairs of offset feed openings surrounded by metal rings or protective flanges which in turn include outwardly extending perches. Such feeders are sold under various model designations including A-6 and B-7 from Droll Yankees, Inc., Mill Road, Foster, R.I. 02825. In some versions of this type feeder, the metal ring includes a downwardly extending portion from which the perch outwardly extends. The perch construction of the present invention is particularly adapted as a replacement for the perch in these aforementioned feeders, although the subject perch has even wider utility.

A drawback of the perch structure of the aforementioned type feeder construction is that it permits feeding of both large and small birds alike. Although these feeders are specially constructed and dimensioned such that very large birds will not be able to easily alight on a perch and feed within the adjacent feed opening or the next higher or lower opening, many birds are willing to attempt such and not only are occasionally successful but also can discourage the feeding of other more desirable species and spill feed by shaking the container or otherwise become a nuisance. Thus it would be desirable to be able to modify such bird feeders and to provide a perch on these and other feeder types which will discriminate between large and small birds. Accordingly, a primary object of the present invention is to devise a perch which will permit small birds to alight thereon and feed from an adjacent feed opening yet will cause larger birds to slide therefrom or otherwise be unable to grasp the perch and thus effectively be discouraged from repeated perch attempts.

These and other objects of the present invention are accomplished by a bird perch adapted for use with bird feeders of the type having at least one feed opening extending through a substantially vertically disposed wall thereof, said perch outwardly extending from said wall at a point substantially in line with and beneath said opening, said perch comprising a hollow, straight cylindrical, wound wire coil having first and second terminal ends with said first end positioned in a perch opening extending through said wall and said second end terminating at a position spaced from said wall to define the lateral extent of said perch, said perch being of a diameter easily grasped by perching birds and further being easily bendable such that large birds will cause the wire to bend downward and cause such birds to slide off while small birds will not cause the wire to bend substantially downward.

Other objects, features and advantages of the invention shall become apparent as the description thereof proceeds when considered in connection with the accompanying illustrative drawing.

DESCRIPTION OF THE DRAWING

In the drawing which illustrates the best mode presently contemplated for carrying out the present invention:

FIG. 1 is a side elevational view of a tubular bird feeder incorporating the novel perch devices of the present invention;

FIG. 2 is a partial side elevational view on an enlarged scale showing particularly the manner in which the perch acts when under the weight of a large bird;

FIG. 3 is a perspective view showing one form of the perch construction of the present invention;

FIG. 4 is a perspective view of another form of the perch of the present invention;

FIG. 5 is a sectional view taken along the line 5—5 of FIG. 2 showing a manner in which the perch shown in FIG. 3 is mounted to the tubular bird feeder;

FIG. 6 is a view similar to FIG. 5 taken along the line 6—6 of FIG. 2 but showing another manner in which the FIG. 4 perch construction is attached to the tubular feeder; and FIG. 7 is a view similar to FIG. 5 taken along the line 7—7 of FIG. 2 but showing still another manner in which a perch construction may be attached to the tubular feeder.

DETAILED DESCRIPTION OF THE INVENTION

Turning now to the drawings and particularly FIG. 1 thereof, the overall bird feeder type on which the discriminating perch of the present invention may be utilized as a substitute fro the solid perch normally provided thereon is shown. It should be pointed out, however, that the perch of the present invention may be used on almost all bird feeder types if they have a feed opening disposed in a generally vertically disposed bird feeder wall and a perch positioned adjacent to such feed opening. Also, the discriminating perch of the present invention may be utilized either as a retrofit unit for bird feeders already in the field or as part of a new bird feeder construction.

Bearing the above in mind, the construction of the feeder 10 shown in FIG. 1 is of overall tubular configuration including a tubular body 12 preferably formed from a transparent or translucent plastic material. Such body 12 includes a number of pairs of feed openings 14 transversely disposed on opposite sides of the tube body 12 and at different levels. The openings are surrounded by a metal ring 16 including a downwardly extending ear portion 18 in which an opening 20 is provided for a conventional solid perch. Opposed rings 16 are connected by a baffle and screws (not shown).

The feeder 10 further includes a bottom 22 and a removable top 24 and a hanging or carrying bail 26. In this regard, the feeder is similar in construction to that described in U.S. Pat. No. 3,568,641 issued to the present applicant.

The opening 20 in the ear portion 18 of the metal ring or shield 16 is of a configuration to match either of the two modified forms of perch construction 30 or 32 shown in FIGS. 3 and 4 respectively. Thus when the perch construction 30 shown in FIG. 3 is utilized, the opening 20 is inwardly outwardly flared to present a sloped side wall 33 for contact with the outwardly flared first end 36 of the perch 30. The other or second end 38 of the perch 30 terminates in a generally planar face disposed at right angles to the normal longitudinal attitude of the perch 30 but may include other configurations in which the terminal wire end 40 is concealed or otherwise treated.

The perch 30 is preferably formed from a continuous wire length that is wound upon an arbor to form an essentially longitudinal extending body 42 in which the individual windings 44 thereof contact each other such that the outside surface of the body portion 42 is essentially closed, that is, it does not present openings between the individual windings 44 such that a bird's feet could become undesirably lodged therebetween or otherwise become caught. In addition, the close or contacting spacing of the windings 44 insures that the perch 30 will bend primarily from a point proximal its first end 36 which is attached to the bird feeder instead of at points intermediate the body portion 42 thereof which could be the case should the windings be more openly spaced. Although such perch bending takes place close to the feeder body 12, it does not occur absolutely adjacent its connection with the body as would be the case with a solid bendable wire perch but exhibits a more gradual bending along a larger radius (believed to occur because of the close spacing and touching of the windings 44) such that the perch can bend essentially straight downward to assure the sliding off of large heavy birds.

Preferably, the wire is a stainless steel material of about 0.020 inch diameter, and twenty to forty windings are provided such that the outward extend or overall perch length when mounted on the tubular bird feeder is between about ½ and ¾ inches. It should be pointed out, however, that other materials may be utilized including non-metallic materials such that the overall desired perch bendability and spring is achieved such that the weight of large birds such as Blue Jays will force the perch to downwardly bend as shown in the progression of the FIG. 2 dotted line representations such that the bird will become frightened and leave the feeder or physically slide therefrom. It should be pointed out that small birds of a materially lesser weight can alight, perch or otherwise rest upon the perch 30 and not force it downwardly and thus obtain the feed in the desired manner.

It should be pointed out that the present perch construction does not attempt to discriminate between large and small birds by providing a extremely thin perch which would make it very difficult for large birds to grasp but relies primarily on the weight factor for such discrimination. It should thus be apparent the diameter or tubular extent of the perch 30 is great enough to provide access for most all birds whether they perch, alight or otherwise grasp or rest upon the body 42 thereof. The outside diameter of such perch 30 is preferably between 1/16 and 3/16 inches.

Turning now to the drawing and particularly FIG. 5 thereof, it should be noted the perch construction 30 is tightly and fixedly positioned between the feeder body wall 12 and the shield 16 whereupon it outwardly extends from the opening 20 in the intended fashion. Thus mounted it may be readily seen that by moving the opposed shields 16, the perch 30 may be replaced when and if desired.

Turning now to FIGS. 4 and 6 of the drawing particularly, an alternate construction perch 32 is depicted. This perch 32 construction is essentially the same as indicated above in reference to perch 30; however, the perch 32 first or attachment end 56 is not flared but of essentially the same construction as the second end 58 thereof. In this respect, it should be pointed out that the individual windings 64 of the perch 32 in essence form a screw thread such that they may be threadably received in the opening 20 which is provided with a threaded bore 66 to receive the perch construction 32. Thus, the opening 20 varies according to the particular perch which it is adapted to receive, that is, the opening being flared when adapted to receive the perch 30 and threaded when adapted to receive the perch 32. Normally, all the perches in any one tubular bird feeder 10 would be of the same construction, that is, either flared or threaded, although there is no reason why they could not be mixed bearing in mind that if such is the case, the openings 20 would have to be configured to accept the particular perch 30 or 32. In other aspects, the perch 32 functions in the same way as that previously described regarding perch 30.

Turning now to FIG. 7 of the drawing, another perch 34 construction is shown. This perch 34 is constructed generally in the same manner and of the same materials as used in the construction of perches 30 and 32 but includes a first or attachment end 68 which exhibits both flared and straight portions 70 and 72 respectively. The flared portion 70 is adapted to engage with a flared counterbore portion 74 of the opening 20. The opening 20 also in the FIG. 7 configuration includes a straight connecting bore 76 which is adapted to engage the straight portion 72 of the first end 68. Both bore 76 and counterbore 74 are smooth, that is, unthreaded.

In practice, the inclusion of a non-flared straight bore adjacent the outwardly extending portion of the various perch constructions seems to increase the operative stiffness of the perch, that is, stiffer than perch types 30 and 34, and perch 34 is stiffer than type 30. Thus, perch type 34 may be viewed as an intermediate type with about half its receiving end flared and half smooth bore with a resultant fit with the similarly configured opening 20 that produces a desirable amount of perch flexibility, that is, easily downwardly bendable upon contact by fairly large heavy birds such as Blue Jays.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A bird perch adapted for use with wild bird feeders of the type having at least one feed opening extending through a substantially vertically disposed wall thereof, said perch outwardly laterally extending from said wall at a point substantially in line with and beneath said opening, said perch solely comprising a hollow, straight cylindrical, wound wire coil having first and second terminal ends and an intermediate laterally extending portion with said first end positioned in a perch opening extending into said wall and said second end terminating at a position outwardly spaced from said wall, that portion of said perch outwardly spaced from said wall being of a diameter easily grasped by perching birds and further being easily bendable such that the weight of large birds thereon will cause the wire to bend downward and cause such birds to slide off while small birds will not cause the wire to bend substantially downward said coil having individual turns and being tightly wound with adjacent individual turns touching each other.

2. The bird perch of claim 1, said coil constructed to bend primarily proximal to its connection with said wall.

3. The bird perch of claim 2, said coil adapted to bend downwardly to an angle approximating 90 degrees such that a major outwardly extending portion of said coil can assume a position approximating parallelism with said vertically disposed wall.

4. The bird perch of claim 1, said coil being wound from about 0.020 inch spring wire with about 20 to 40 individual windings.

5. The bird perch of claim 1, said coil extending outwardly from said wall a distance of between ½ inch and ¾ inch.

6. The bird perch of claim 1, said first terminal end threadably connected in said wall perch opening.

7. The bird perch of claim 6 wherein the feeder is of the type having a protective collar mounted against the outside of said wall and disposed around said feed opening, said perch opening disposed in said collar.

8. The bird perch of claim 1 wherein the feeder is of the type having a protective collar mounted against the outside of said wall and disposed around said feed opening, said perch opening disposed in said collar, said first terminal end of said coil being outwardly flared with said flared end disposed against said wall and those portions of said coil proximal said flared end extending through said perch opening so as to attach said perch to said feeder.

9. The bird perch of claim 8, said flared portion of said first perch terminal end extending about one half of the lateral extent of the perch opening in said collar.

10. The bird perch of claim 8, said coil first end disposed between and in contact with both the outside of said bird feeder wall and the inside of said collar so as to mechanically hold and thus position said perch on said feeder.

* * * * *